United States Patent
Borkenhagen et al.

(10) Patent No.: US 9,460,049 B2
(45) Date of Patent: Oct. 4, 2016

(54) DYNAMIC FORMATION OF SYMMETRIC MULTI-PROCESSOR (SMP) DOMAINS

(71) Applicant: Lenovo Enterprise Solutions (Singapore) Pte. Ltd., Singapore (SG)

(72) Inventors: John M. Borkenhagen, Rochester, MN (US); James S. Fields, Jr., Austin, TX (US); Eugen Schenfeld, Monmouth, NJ (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 399 days.

(21) Appl. No.: 13/945,294

(22) Filed: Jul. 18, 2013

(65) Prior Publication Data
US 2015/0026432 A1    Jan. 22, 2015

(51) Int. Cl.
*G06F 15/80*   (2006.01)
*G06F 12/08*   (2016.01)
*H04J 14/00*   (2006.01)
*H04L 12/28*   (2006.01)
*H04Q 11/00*   (2006.01)

(52) U.S. Cl.
CPC ........... *G06F 15/80* (2013.01); *G06F 12/0815* (2013.01); *H04J 14/00* (2013.01); *H04L 12/2854* (2013.01); *H04Q 11/0062* (2013.01); *G06F 12/0813* (2013.01); *G06F 12/0833* (2013.01); *G06F 2212/621* (2013.01); *H04Q 2011/0086* (2013.01); *H04Q 2011/0094* (2013.01)

(58) Field of Classification Search
CPC .. G06F 15/80; G06F 9/5061; G06F 12/0806; G06F 12/0808; G06F 12/0813; G06F 12/0817; G06F 12/082; G06F 12/0822; G06F 12/0824; G06F 12/0826; G06F 12/0828; G06F 12/0831; G06F 12/0833; G06F 12/0835; G06F 12/0837; G06F 12/084
See application file for complete search history.

(56) References Cited

U.S. PATENT DOCUMENTS 4,313,150 A    1/1982  Chu
4,614,389 A    9/1986  Albert et al.
(Continued)

FOREIGN PATENT DOCUMENTS

CN    1051254 A    5/1991
CN    2422670 Y    3/2001
(Continued)

OTHER PUBLICATIONS

Search Report for related PCT application No. PCT/IB2014/058828 dated Jun. 13, 2014, 4 pages.
(Continued)

*Primary Examiner* — Michael Krofcheck
(74) *Attorney, Agent, or Firm* — Katherine Brown; Andrew M. Calderon; Roberts, Mlotkowski, Safran, Cole & Calderon, P.C.

(57) ABSTRACT

Symmetric multi-processor (SMP) nodes are dynamically configured via SMP sockets that use SMP optically-connected switches to dynamically connect SMP optically-connected links connected to the SMP nodes to form SMP domains based on best matched expected workloads for coherent traffic for exchanging SMP coherent information. The SMP nodes are dynamically added to one of the SMP domains and/or dynamically removed from one of the SMP domains.

17 Claims, 10 Drawing Sheets

(56) References Cited

U.S. PATENT DOCUMENTS

| | | |
|---|---|---|
| 5,355,489 A | 10/1994 | Bealkowski et al. |
| 6,056,579 A | 5/2000 | Richards, III et al. |
| 6,539,142 B2 | 3/2003 | Lemoff et al. |
| 6,701,038 B2 | 3/2004 | Rensing et al. |
| 6,975,788 B2 | 12/2005 | Basavanhally et al. |
| 6,985,271 B2 | 1/2006 | Yazdi et al. |
| 7,155,125 B2 | 12/2006 | Mori |
| 8,014,640 B2 | 9/2011 | Xia et al. |
| 8,121,478 B2 | 2/2012 | Kash et al. |
| 8,208,771 B2 | 6/2012 | Ikeda et al. |
| 2004/0215865 A1* | 10/2004 | Arimilli ............... G06F 13/4081 710/302 |
| 2004/0228359 A1* | 11/2004 | Korb ................... H04L 12/2854 370/406 |
| 2005/0223188 A1* | 10/2005 | Moll ..................... G06F 13/1684 711/202 |
| 2005/0276604 A1* | 12/2005 | Morrow .............. H04J 14/0241 398/73 |
| 2006/0179247 A1* | 8/2006 | Fields ................. G06F 12/0831 711/141 |
| 2006/0271743 A1* | 11/2006 | Clark .................. G06F 12/0831 711/141 |
| 2008/0147988 A1* | 6/2008 | Heller ................. G06F 12/0831 711/141 |
| 2009/0169206 A1 | 7/2009 | Friedrich |
| 2009/0327643 A1* | 12/2009 | Goodman ........... G06F 12/0646 711/173 |
| 2010/0042809 A1* | 2/2010 | Schenfeld ............. G06F 9/5061 712/29 |
| 2010/0234035 A1 | 9/2010 | Fujishima et al. |
| 2012/0102137 A1* | 4/2012 | Pruthi ................. G06F 12/0813 709/213 |
| 2013/0124597 A1* | 5/2013 | Diao ....................... H04L 67/02 709/201 |
| 2014/0281266 A1* | 9/2014 | Johnson .............. G06F 12/0817 711/141 |

FOREIGN PATENT DOCUMENTS

| | | |
|---|---|---|
| CN | 201063340 Y | 5/2008 |
| JP | 2002031767 A | 1/2002 |
| JP | 2005189548 A | 7/2005 |
| JP | 2008181149 A | 8/2008 |
| WO | 2004015439 A1 | 2/2004 |

OTHER PUBLICATIONS

Marin Soljačić et al., "All-optical switching using optical bistability in non-linear photonic crystals", Proceedings of SPIE vol. 5000 (2003) ©, 2003 SPIE.

Gholam-Mohammad Parsanasab et al., "Integrated Polymeric All-Optical Switch", Journal of Lightwave Technology, vol. 29, No. 18, Sep. 15, 2011.

Tze-Wei Yeow, et al., "MEMS Optical Switches", IEEE Communications Magazine, Nov. 2001.

Robert Keil , "All-optical routing and switching for three-dimensional photonic circuitry", Scientific Reports, Published Sep. 15, 2011.

K. H. Craig et al., "All-Optical Switching in Prism Coupling to Semiconductor-Doped Glass Waveguides", Electronics Letters, vol. 23 No. 10, May 7, 1987.

International Preliminary Report and Written Opinion of the International Searching Authority for PCT/EP2014/060677 Application dated Jan. 28, 2016, 6 pages.

\* cited by examiner

SMP FABRIC TOPOLOGY EXAMPLES - EXAMPLE OF RING OTHERS POSSIBLE

2D MESH

2D TORUS

2D MESH

DYNAMIC FORMATION OF SYMMETRIC MULTI-PROCESSOR (SMP) DOMAINS

BACKGROUND OF THE INVENTION

1. Field of the Invention

The present invention relates generally to computer systems, and more particularly to dynamic formation of symmetric multi-processor (SMP) domains.

2. Description of the Related Art

In today's society, computer systems are commonplace. Computer systems may be found in the workplace, at home, or at school. Computer systems may include data storage systems, or disk storage systems, to process and store data. Generally, computer systems are designed to accept and execute various application programs provided by a user, using an operating system to manage the computer resources required to execute the application programs. Trends towards increased performance of computer systems often focuses on providing faster, more efficient processors. Traditional data processing systems typically include a single processor interconnected by a system bus with memory and I/O components and other processor components. As technology improves, and a need exists for faster and more efficient data processing systems by dynamic formation of symmetric multi-processor (SMP) domains in a SMP topology.

SUMMARY OF THE INVENTION

In one embodiment, a method is provided for dynamic formation of symmetric multi-processor (SMP) domains using at least one processor device in a computing environment. In one embodiment, by way of example only, SMP nodes are dynamically configured via SMP sockets that use SMP optically-connected switches to dynamically connect SMP optically-connected links connected to the SMP nodes to form SMP domains based on best matched expected workloads for coherent traffic for exchanging SMP coherent information. The SMP nodes are dynamically added to one of the SMP domains and/or dynamically removed from one of the SMP domains.

In another embodiment, a computer system is provided for dynamic formation of symmetric multi-processor (SMP) domains using at least one processor device, in a computing environment. The computer system includes a computer-readable medium and a processor in operable communication with the computer-readable medium. In one embodiment, by way of example only, the processor dynamically configures the SMP nodes via SMP sockets that use SMP optically-connected switches to dynamically connect SMP optically-connected links connected to the SMP nodes to form SMP domains based on best matched expected workloads for coherent traffic for exchanging SMP coherent information. The SMP nodes are dynamically added to one of the SMP domains and/or dynamically removed from one of the SMP domains.

In a further embodiment, a computer program product is provided for dynamic formation of symmetric multi-processor (SMP) domains using at least one processor device, in a computing environment. The computer-readable storage medium has computer-readable program code portions stored thereon. The computer-readable program code portions include a first executable portion that dynamically configure SMP nodes via SMP sockets that use SMP optically-connected switches to dynamically connect SMP optically-connected links connected to the SMP nodes to form SMP domains based on best matched expected workloads for coherent traffic for exchanging SMP coherent information. The SMP nodes are dynamically added to one of the SMP domains and/or dynamically removed from one of the SMP domains.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
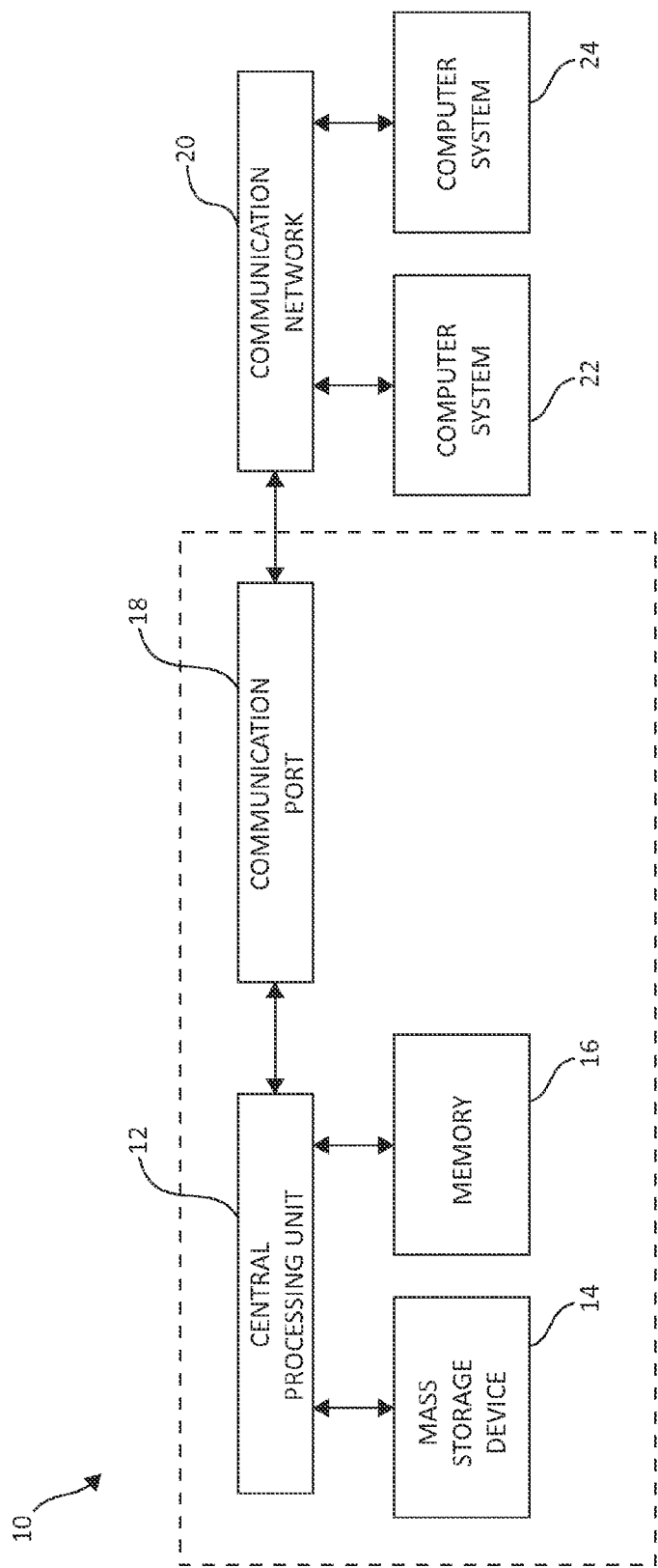
FIG. 1 is a block diagram illustrating a computing system environment having an example storage device in which aspects of the present invention may be realized.

In one embodiment, as described herein, symmetric multiprocessing (SMP) is the processing of application programs and operating systems using multiple processors that share a common operating system and memory. A single copy of the operating system is available to all the processors who share equal access to a common memory via a communication path of some form.

In one embodiment, the goal of the SMP system is to dynamically balance the workload between the available processors, optimizing the use of the resources and providing the user with faster operation. Moreover, in one embodiment, the Symmetric multiprocessing (SMP) involves a multiprocessor computer hardware and software architecture where two or more identical processors are connected to a single shared memory, have full access to all input/output (I/O) devices, and are controlled by a single operating system (OS) instance, and in which all processors are treated equally, with none being reserved for special purposes. The SMP may implement a theoretical PRAM (Parallel RAM) model in a cache hierarchy. In one embodiment, copies of shared memory content are in local caches. When such copies change (writes), coherent broadcast need inform everyone. The more changes (e.g., writes) that occur the more bandwidth that is needed for the broadcast. This need for more bandwidth is dependent on the applications; some workloads require little some require a significant amount of bandwidth. Given a coherent traffic bandwidth budget (e.g., a percentage (%) of overall bandwidth of the fabric) the max size of SMP domains can be calculates. In one embodiment, this is a fixed size, depending on worse case mix of applications considered up front. Also, coherent traffic varies from a small amount (e.g., 1%) of coherent traffic (where software based SMP over Ethernet are used) to a large amount (at least 10%) of coherent traffic. Uncertainty times of updates vary based on the applications (and distance/latency of the fabric). In one embodiment, an SMP programming model is very convenient and powerful for power scaling to many nodes in racks and datacenters.

It should be noted that the terms "small" and "large" are relative expressions that in general are a percentage of overall bandwidth the fabric can support. For example, if the total bisection bandwidth the SMP fabric supports is 10 Tbyte/sec, and there are 8 SMP nodes in the fabric, small may be referred to as one percent (e.g., 1%) and large could be at least ten percent (e.g., 10%) or more. Coherent traffic is the information sent to all nodes in the SMP fabric that need to change their local cache copy (invalidate) because one node has changed the memory location for which that copy in the local cache was representing, so that copy is no longer valid. Coherent traffic is thus a function of how many writes are present in an SMP fabric by the SMP connected nodes. For some applications, if all nodes keep changing the cache copies, such traffic will be a high percentage of the overall bandwidth, e.g. 10% or more. On the other hand, other applications, may not need such updates because only seldom a node will perform a write to a memory location the copy of which, has been locally cached by SMP nodes. If the number of nodes in an SMP is very large, chances are that such updates are more often, to a point that a majority of the bandwidth the fabric supports is consumed by such updates.

However, the SMP fabrics are fixed due to inability to change wiring between nodes on the fly. Packet switches cannot process high traffic at low latency SMPs needed for extreme use. The SMP links have high bandwidth and require minimal latency in handling, however, there are no external switches for extreme use, and software based SMPs are very limited (e.g. to special HPC applications). For extreme SMP use cases, latency of passing through hops may hurt the incoherency and thus invalidate the solutions.

In one embodiment, an SMP system may be formed in a fixed way by connecting two or more processor sockets with specialized links to form a multiprocessor. In alternative embodiments, an SMP system may be formed to enable a software based SMP over any type of network links, not necessary special ones (hardware assisted SMP/Coherent links). However, there are several problems in both of these approaches. The first (hardware based) exhibit a limit of the number of separate processors (i.e. sockets) connected into one SMP. Various limitations exist on such connections. For example, coherent information needs to be broadcasted to all processors. The larger the number of the processors, the more load such coherent fabric traffic places on the network. Various filtering systems, may reduce the coherent traffic, however, it is very hard to create SMP systems with tens and/or thousands of processors. The faster the processors and the larger the number of cores in each chip, the more bandwidth is needed and the more traffic (cache reads/writes) that may require broadcast to invalidate cache copies once the data has changed, is needed. The software system implementing SMP like functionality, is very slow and relies on exceptions (interrupts of pages) to capture changes of cache data content and thus such needs to be broadcast to other nodes in the SMP domain. Such mechanism is limited to very isolated processors that do not work effectively in parallel.

Thus, a need exists to form SMP domains on the fly, because an SMP programming model is very easy and efficient to work with, and a hardware based (fast) approach is also needed. Such an approach may be limited to a maximum number of participating processors (e.g., sockets with multiple cores each) however, the specific sets of such sockets and their inter and intra SMP relationships may be dynamically changed. In one embodiment, such dynamic changes do not need to occur often (e.g., may occur every few seconds at most). In one embodiment, the multiple SMP domains that are dynamically formed may be carved out on demand from a large group of sockets, and the membership of each SMP domain may be dynamically changed resulting in a very efficient and fast solution.

Thus, in one embodiment, SMP domains are formed as scalable topologies defined by the fabric routing by using optical switches to dynamically connect optical "wires" of SMP links out of nodes. The SMP nodes may be switched in and/or out, and split into separate domains (e.g., similar to fault tolerant considerations that need find rerouting around bad nodes—nodes that are not functioning according to design, performance standards/thresholds, user preferences, and/or based on detected faults/errors). In one embodiment, SMP link protocols have a retry and retransmit function for allowing for dynamic changes. In one embodiment, the SMP domains may be created to best match expected workloads needs from small workloads to large workloads within the expected coherent bandwidth traffic allocation. In one embodiment, long physical distances for SMP domains are possible in cases that speed of light latency will not damage the uncertainty of coherent local cache copies different nodes have. In one embodiment, long physical distances for SMP domains are possible for large distances comparable to software SMPs but with much better latency and bandwidth using same building blocks for small and large systems.

In one embodiment, the SMP fabric links may be connected in a scalable topology as defined by the fabric routing algorithm (e.g. ring or mesh/torus). A processor socket may be switched in and/or out of such SMP fabric, by connecting it to a circuit switch. For high bandwidth SMP links, optical technology such as the silicon (Si) Photonics, with multiple wavelengths per single fiber and/or waveguides may be used. Such optical links may be connected to a large optical switch for example, which may form any desired topology as needed. In one embodiment, mechanism in the SMP links need to retry a connection so that dynamic changes can be supported. A control mechanism (e.g., a processor device) may partition SMPs and/or join SMPs' domain as needed, depending on the nature of the workloads and what expected coherency traffic they will require. This, which is the SMP domain or a creation of a new SMP domain, can also change dynamically, and scale dynamically with additional nodes, if the workloads can take advantage of such (and still be within the overall coherency bandwidth budget). The SMP domain is connecting multiple SMP nodes, with a fabric, so that all nodes can access a common memory (shared memory model) and get/retrieve copies of the content of such memory to the node's local cache. The shared memory is accessed by providing a physical address that defines what data the nodes want to access. Such address is the "ID" of the data, and any user/application who wants to reference that data will use such address. If the local SMP domains needs to be split because of too much coherent traffic (e.g. too high), and/or grow/increase by adding more SMP nodes because the Coherent traffic is low, e.g. 1% or less the fabric bisection bandwidth, the SMP domain, i.e. the group of nodes that are connected together as an SMP, can change dynamically.

However, currently there are no known solutions that rewire SMP links and processing sockets based on the needs of an SMP node. Current systems are hardwired in advance and lack the flexibility to better match needs. However, the mechanisms of the present invention provide for a best match of needs for each of the SMP node to a formed platform resulting in better utilization of the SMP paradigm for both small and/or large problems, and for small and/or large SMP domains (with few or many processing nodes as appropriate). The ability to change the number of nodes each SMP domain ("domain" means the group of nodes that are connected such that if a copy of a shared memory location changes all nodes get to know it because of the coherent traffic) can be large or small depending on the appropriate application running and its needs. Some application can only be supported with a small number of nodes in the SMP because users/applications keep writing and/or changing the memory locations, forcing a lot of coherent traffic to be sent through the fabric. Other applications seldom write or change the content of the shared memory and/or not every user/application has a copy of that shared memory, hence very large number of nodes (e.g. 100s) can be connected and work in a shared memory coherent SMP system. This is more favorable because this is the core of the present invention, and the present invention can dynamically decide how many nodes and which nodes are connected for each SMP domain. Until now, such a decision was fixed and made to handle some worse case or "average" case, but the present invention can dynamically change that as needed. These SMP domains may be created over larger distances from backplane levels to a rack, and to a few racks, limited by the speed of light delays and by coherency latency desirable where in the worse case it would of course be much better than software based SMP schemes. This is another important aspect of the present invention. The present invention no longer need limit the SMP model to be locally. Today, the SMP systems are usually local, connecting nodes that are in close proximity. That is because the coherent traffic needs also to have some maximum latency to travel to all nodes and such depends on the workload they do. For example, it may be needed that all SMP nodes in a fabric know about changes in their cache copy of the shared memory in, say 40 nanoseconds. This will prevent to connection of nodes over large distances, because of the limitation to send the coherent information updates, including but not limited to, the speed of light and routing delays for getting such to all nodes that need to know. But in other cases, such nodes may not need to know the invalidation of their local cache copies (i.e. coherent traffic info) so urgently, and can work fine even with, say, a microsecond or more delays (such scheme are already showing in software based SMPs). In one embodiment, the present invention can use the same hardware links and mechanism, to connect close by and/or remote nodes, even far away nodes with 100s of feet away, and still enjoy the same hardware coherent fabric and efficiency of using such, vs. layers of software to do this control over a regular network that is not an SMP fabric, e.g. ethernet switches and network in a datacenter.

In one embodiment, the present invention provides for a system comprising of SMP nodes each with multiple SMP links connected optically. An optical switch connects SMP nodes to each other through their optical SMP links. In one embodiment, various types of scalable topologies are provided (e.g., based on user and/or architecture preferences), and connect SMP nodes to each other supported by routing through an SMP fabric, routing tables, and/or other methods (e.g., routing algorithms). In one embodiment, software control elements combine and/or split address spaces. In one embodiment, routing tables of local SMP nodes are updated to reflect adding/removing SMP nodes. The adding and/or removing SMP nodes at certain computation points to preserve coherency, however, this is not done per each workload, but rather on the needs per new consolidated SMP group needs of multiple workload. In embodiment, the flexibility of the SMP domains formation creates new platforms to run on groups of nodes. In one embodiment, the present invention replaces a faulty SMP node with a new SMP node in fault tolerant techniques and/or other events, and this is another aspect of the present invention. In a fixed SMP fabric, nodes are connected in a rigid way, and routing is done through the links hardwired connection them in some sort of topology. But, in the present invention, the embodiments herein eliminate a bad node (e.g., a bad node, links, and/or operation has faults, problems, fails to perform according to specifications, and/or not working right) and connect another node in its place leaving the topology of the SMP fabric intact thereby simplifying and increasing the speed of the operation instead of having to find ways to bypass that faulty node. In one embodiment, the present invention may use fault tolerant approaches that suggest what topologies can be routed around and/or bypass bad nodes, and what are easy to scale with adding nodes dynamically to same topology. Thus, in one embodiment, in addition to changing SMP domains dynamically based on a new set of workloads expected degree of coherency, the security and/or other needs may provide additional reasons to change the SMP domains dynamically.

Thus, in one embodiment, the present invention uses optical interconnection technology (e.g., silicon (Si) Photonics, enabling a large amount of bandwidth from a processor chip as close as first level packaging, and all optical switches) so as to consider a processor having all optical links coming out of the socket of the processor. Such links may be used generally for any purpose, for example, to connect memory, to connect I/O and/or to connect other processors sockets to form an SMP domain. In one embodiment, an optical switch may dynamically configure what sockets are connected together as SMPs (e.g., the optical switch is used to configure connections of memory banks and/or I/O devices such as storage). In one embodiment, each SMP domain may accept a new socket and/or a part of an SMP domain from an existing socket. In one embodiment, a new socket may be part of all shared memory and accept coherent traffic transactions as well as having access to all the other components connected to other sockets (e.g. memory banks and I/O), however, such access is only through the owner's sockets. The changes of SMP membership may occur every few seconds (e.g., occur every 2 seconds), for example, and/or as long as the SMP domain is usable. Such dynamic formation of SMP domains provides for an efficient system and datacenter.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
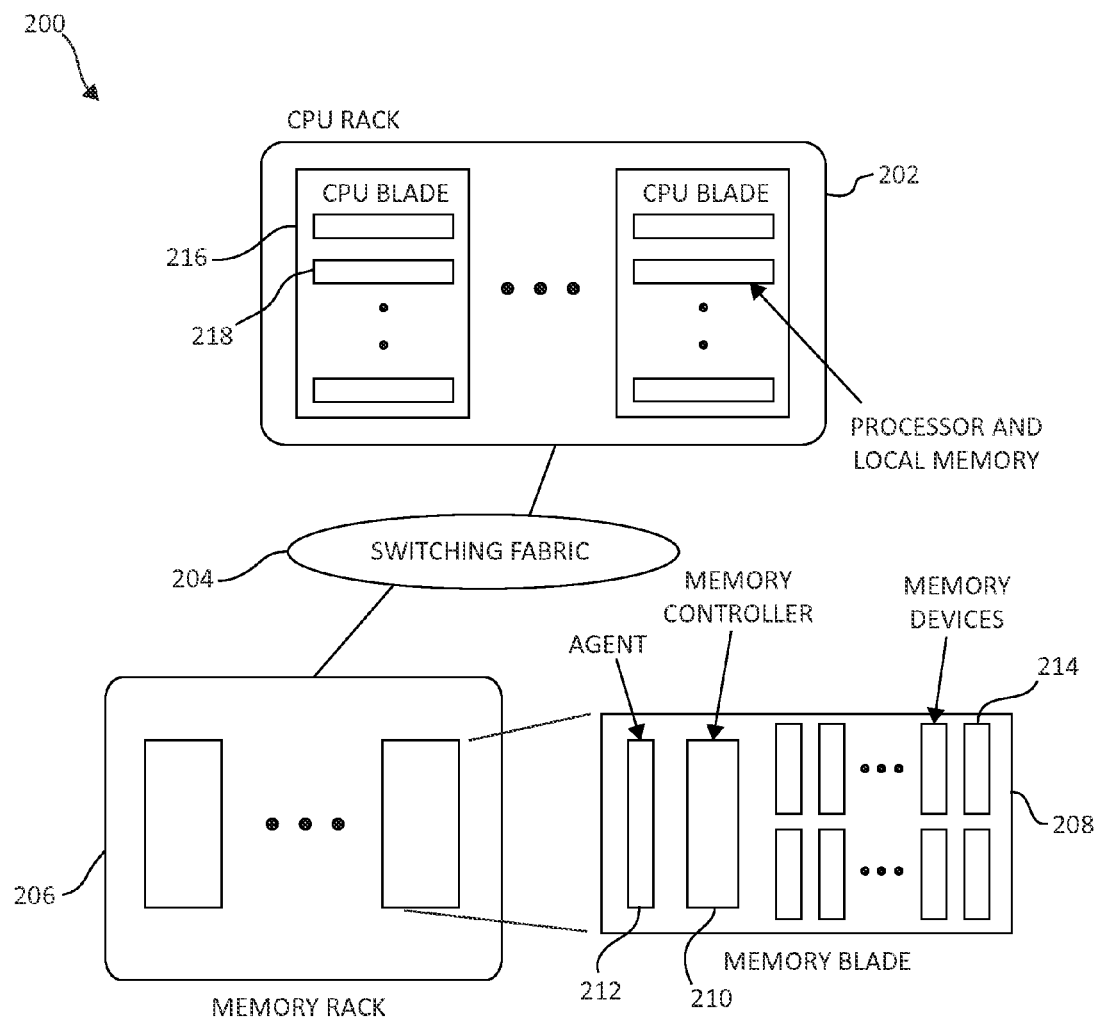
FIG. 2 is a block diagram illustrating a hardware structure of an optically connected memory system in which aspects of the present invention may be realized.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an optically connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, in the protocol chosen to facilitate such high bandwidth and has the ability to support memory switching within one physical link or multiple physical links to look like one high bandwidth physical link made of a few physical links. Since these external links are circuit switched, via at least one optical switch 204, data or content of such, these should use a very lightweight communication protocol.

Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. These external links are common to all memory blades and processor blades.

It should be noted that at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Since these external links are circuit switched, via an all optical switch that will not be aware of the protocol, data or content of such, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below in other embodiments, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
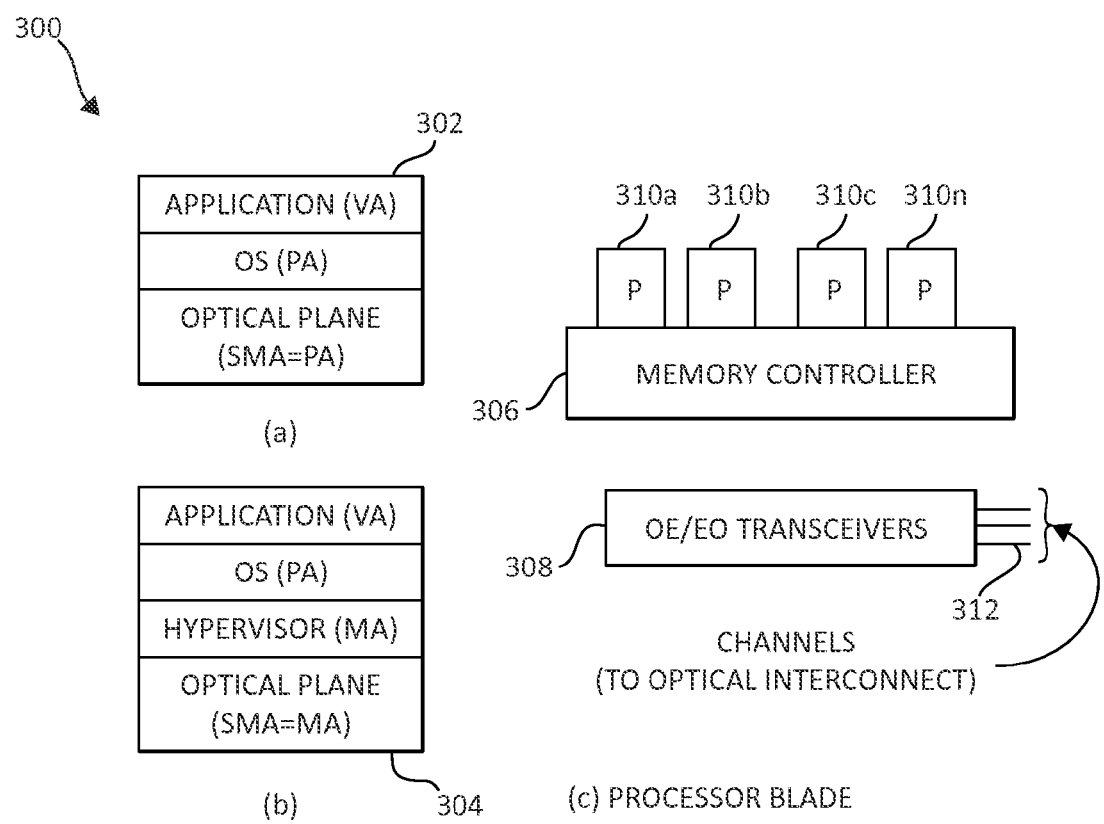
FIG. 3 is a block diagram illustrating a hardware structure of a processor design in the optically connected memory system.
Figure 4:
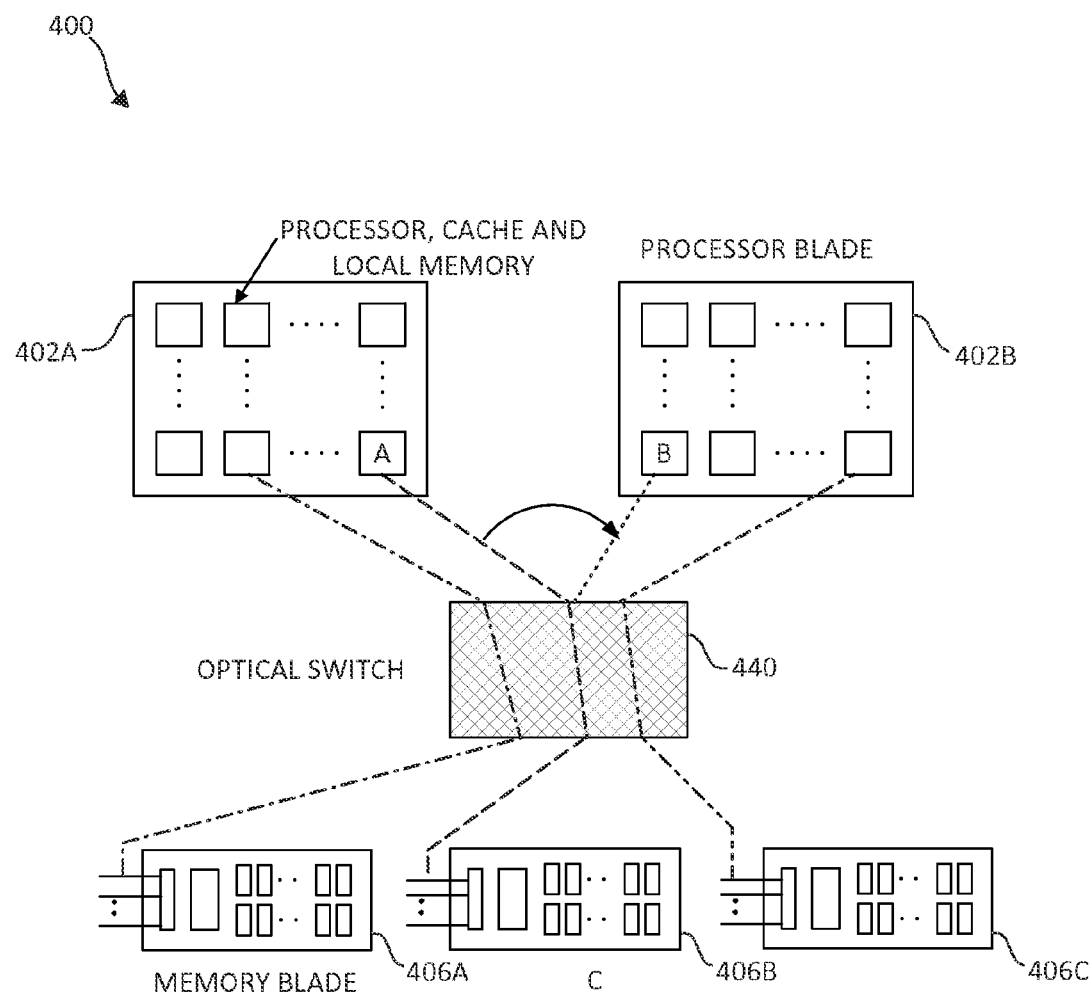
FIG. 4 is a block diagram illustrating a hardware structure for switching memory through an optical interconnection fabric in a computer system in which aspects of the present invention may be realized.

Turning now to FIG. 3, FIG. 3 is a block diagram 300 showing a hardware structure of a processor design in the optically connected memory system in a computer system. As illustrated in FIG. 3, the processor side design 300 illustrates: (a) software stack in system (without virtualization) 302 and 304 (with virtualization) and (b) the processor blade communicates with remote memory blades through optical transceiver 308 and 312. There is a memory controller 306 associated with local memory pool 310a-n. If a System Memory Address (SMA) space (as shown in 302 and 304 of FIG. 3) is above a certain, predefined limit, the SMA is mapped to a remote memory address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/optical-to-Electrical (OE) transceivers 312 which are connected to, for example, a Northbridge® chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310A-N) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

In an optically connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 402 A and 402B) can allocate memory from a remote memory blade by initiating a circuit with the memory blade 406 (shown as 406a-c) and sending the memory request to the remote memory controller. In such a memory system, a processor node 402 holding super pages within a remote memory blade can signal another processor to establish a circuit with the remote memory blade 406 (shown as 406a-c) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406a-c) if it no longer requires any superpages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively. In the embodiments listed below, the (remote and local) memory management issues and the switching protocols are described.

Using the various descriptions provided herein, in one embodiment, the present invention provides a system comprising of processing nodes with SMP links, each node may have multiple SMP links that may be connected as optical links. An optical crossbar switch (and/or a number of such forming a non blocking topology) connect all SMP links from all processing nodes. The optical switch in turn, may form the actual fabric topology between the processing sockets as needed, and connect a few and/or many nodes within one SMP fabric. Software elements need to partition address spaces or combine address spaces depending on the size and number of SMP domains merged or split. Routing tables of the SMP fabric need be locally updated to allow such expansion or contraction of the dynamic group.

In one embodiment, individual processing nodes maybe removed or added keeping with the topology minimal quantum extensions to conform to the routing. For example, in a ring topology (single dimension torus), a node can be removed from the ring, by bypassing its SMP links (left and right). Similarly, a node can be added to the ring by opening an SMP connection and inserting in between two SMP links of a new node.

In one embodiment, the insertion and extraction is performed at certain points that the computation and/or the control allows so as to preserve the coherency of the fabric. If there is a fabric that is an SMP, such as a ring topology and one node fails, currently, in a fixed SMP case, i.e. when links of SMP nodes are hardwired, it is required to go around the other side of the ring, since the fault node, wont pass any communication (assuming it does not hurt such communication, but the good/properly function nodes can decide to cut the links to that faulty node). However, in the present invention, the embodiments herein reconfigure the nodes, and eliminate that bad node, and bring another node in its place. Also, if it is desired to grow the topology by adding more SMP nodes, the present invention can keep the ring structure and open the connection between two SMP links, to insert one or more nodes, and close that again to form the ring topology. Hence the ring topology can scale to any number of nodes, from 2 to 1000s, and the insertion of such nodes, can easily be accommodated and yet still preserve the ring structure.

Furthermore, if a number of workloads of virtual machines (VMs) finish running and the system is prepared for a new group of workloads (VMs) the SMP domains are dynamically rewired based on expected new needs. Fault tolerance topology techniques may also apply for small intentional changes that are not triggered by a fault, but by another events (security issues such as a misbehaving workload that runs on a node which has to be isolated). The intentional changes means changes are triggered not by a fault, but there may be a need to take out a node from an SMP domain. For example, some bad behaviors may be detected on a node that is suspect to say security problems, and assume a user ran an application there that tries to go to places it should not. Hence, such a node may be isolated from the rest of the SMP domain nodes, by disconnecting its SMP links. Also, small intentional changes may refer to even a single node that connects to other nodes with the SMP links through the OCS switch.

Figure 5:
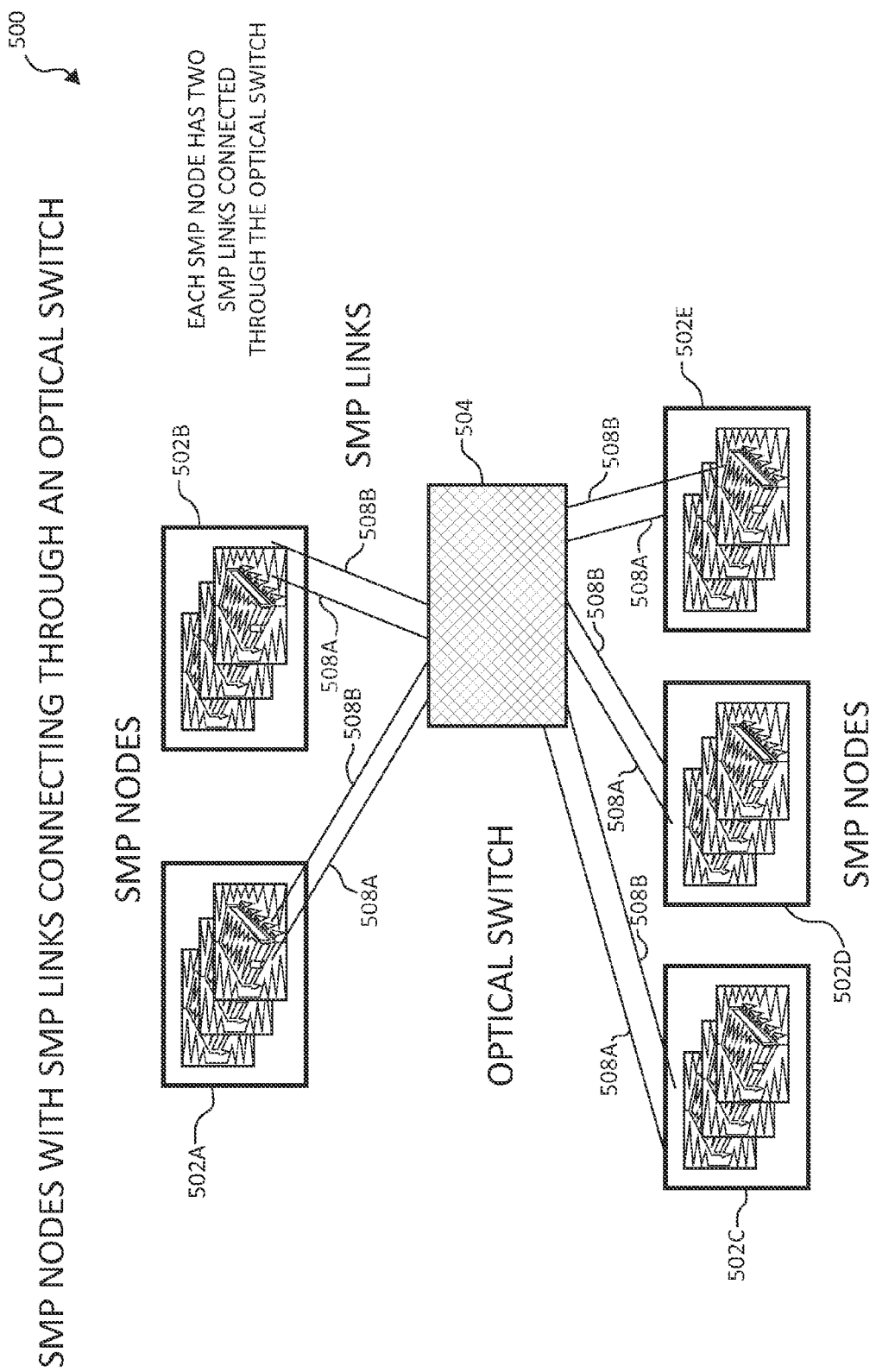
FIG. 5 is a block diagram illustrating symmetric multi-processor (SMP) node with SMP links connecting through an optical switch in which aspects of the present invention may be realized.
Figure 6:
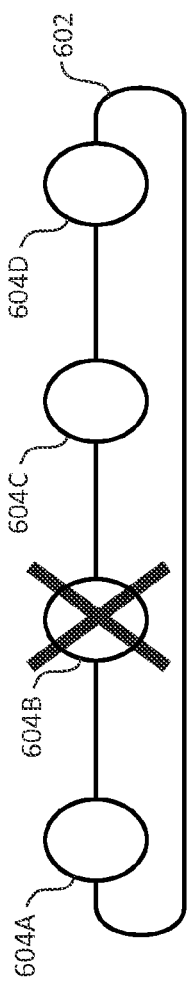
FIG. 6 is a block diagram illustrating an exemplary symmetric multi-processor (SMP) fabric topologies forming a ring topology between SMP nodes in which aspects of the present invention may be realized.
Figure 6:
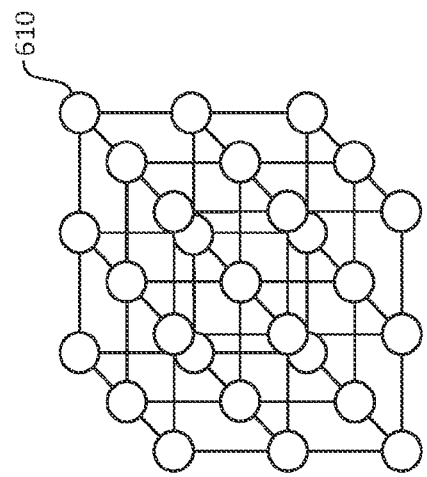
Figure 6:
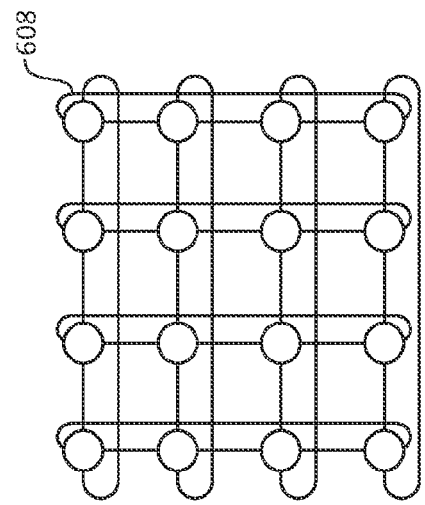
Figure 6:
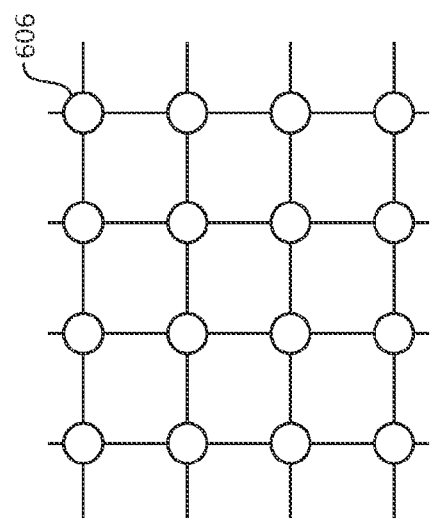

FIG. 5 is a block diagram 500 illustrating symmetric multi-processor (SMP) node with SMP links connecting through an optical switch in which aspects of the present invention may be realized. As indicated in FIG. 5, multiple SMP nodes 502 (illustrated in FIG. 5 as 502A-E) each have 2 SMP links 508A and 508B connected through an optical switch 504. Turning now to FIG. 6, is a block diagram illustrating exemplary symmetric multi-processor (SMP) fabric topologies forming a ring topology between SMP nodes in which aspects of the present invention may be realized. As illustrated, the SMP fabric topology may form a rings topology 602 between SMP nodes 604 (shown in FIG. 6 as 604A-D). However, the scalable topology, as defined by the fabric routing algorithm, may form a variety of topologies such as the ring topology 602, a two dimensional (2D) 2D-mesh topology 606, a 2D torus topology 608, and/or a three dimensional (3D) 3d mesh topology 610 with the SMP nodes 604.

Figure 7:
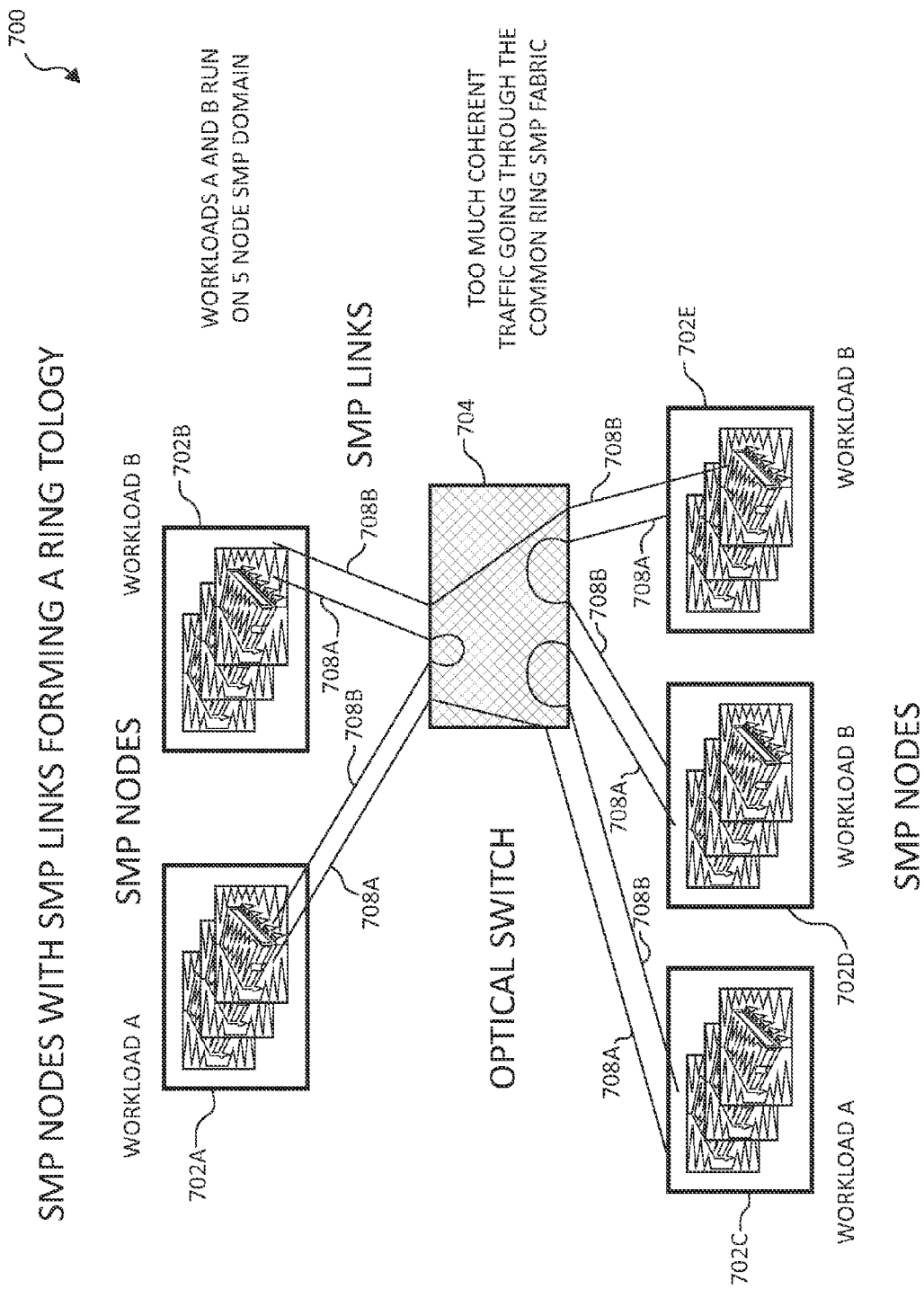
FIG. 7 is a block diagram illustrating a symmetric multi-processor (SMP) node with SMP links forming a ring topology in which aspects of the present invention may be realized.
Figure 8:
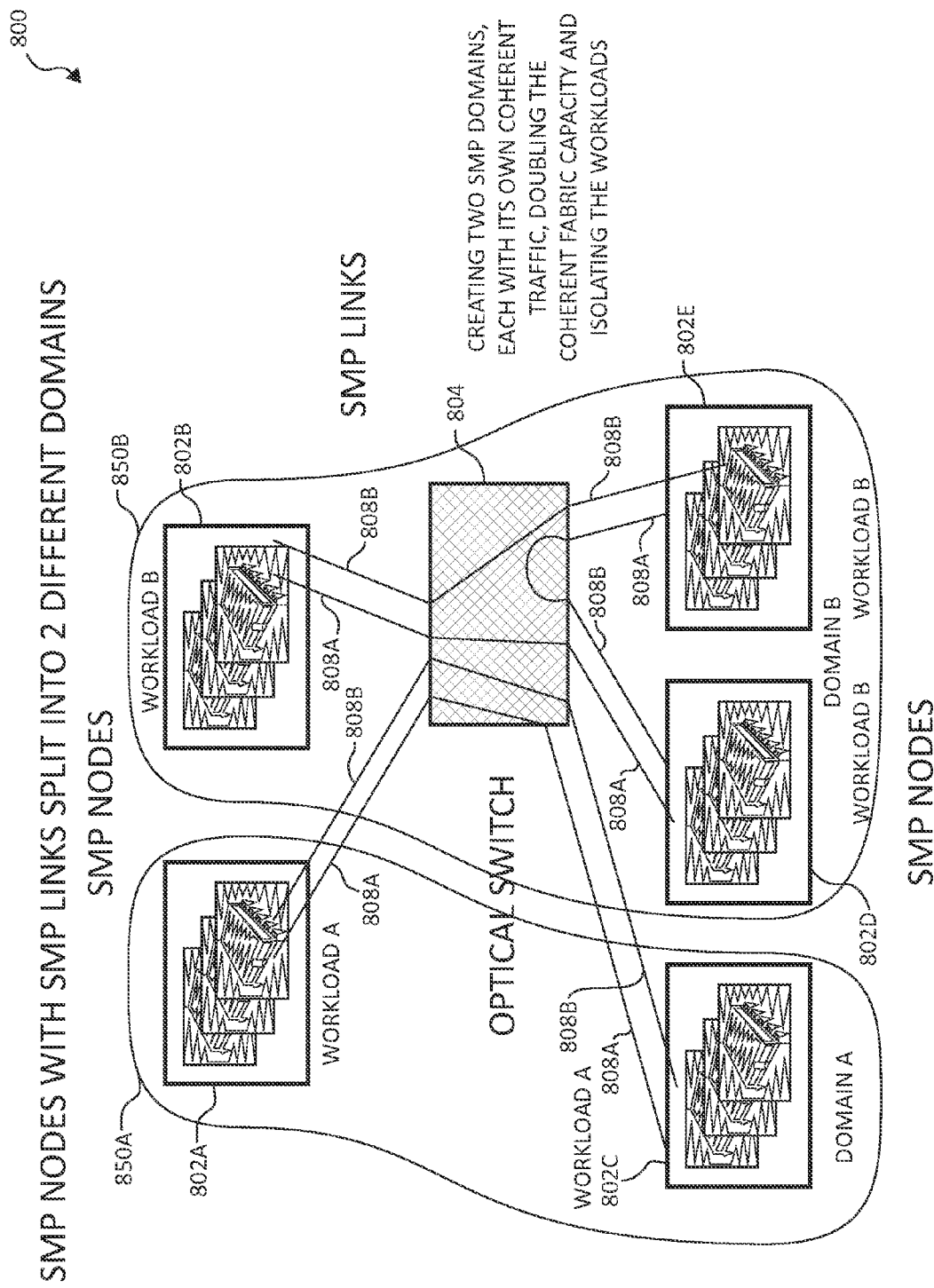
FIG. 8 is a block diagram illustrating a symmetric multi-processor (SMP) node with SMP links splitting into at least 2 different domains in which aspects of the present invention may be realized.

FIG. 7 is a block diagram 700 illustrating symmetric multi-processor (SMP) node with SMP links forming a ring topology in which aspects of the present invention may be realized. As indicated in FIG. 7, multiple SMP nodes 702 (illustrated in FIG. 7 as 702A-E) each have 2 SMP links 708A and 708B connected through an optical switch 704. In one embodiment, by way of example only to illustrate the present invention, workload A runs on SMP node 702A and 702C, and workload B on SMP node 702B, 702D, and 702E, (e.g., workload A and workload B run on 5 SMP node domain each using 2 SMP links 708A and 708B). However, too much coherent traffic is going through the common ring SMP fabric. Thus, turning now to FIG. 8, a block diagram illustrating symmetric multi-processor (SMP) node with SMP links splitting into at least 2 different domains in which aspects of the present invention may be realized is depicted. In one embodiment, the present invention provides for a system comprising of SMP nodes each with multiple SMP links connected optically. An optical switch 804 connects SMP nodes to each other through their optical SMP links 808. In one embodiment, various types of scalable topologies are provided (e.g., based on user and/or architecture preferences), and connect SMP nodes 802 to each other supported by muting through an SMP fabric, routing tables, and/or other methods (e.g., muting algorithms). As indicated in FIG. 8, multiple SMP nodes 802 (illustrated in FIG. 8 as 802A-E) each have 2 SMP links 808A and 808B connected through an optical switch 804. However, the SMP nodes with the SMP links are now split into two separate/different domains. By creating two SMP domains 850A and 850B, each with its own coherent traffic, the present invention doubles the coherent fabric capacity and isolates the workloads. Now, in one embodiment, by way of example only to illustrate the present invention, workload A runs on SMP node 802A and 802C in a first SMP domain 850A (e.g., Domain A), and workload B runs on SMP node 802B, 802D, and 802E in a second SMP domain 850B (e.g., Domain B, with each SMP node in both SMP domain A and B using 2 SMP links 808A and 808 with an optical switch 804. Thus, in one embodiment, Symmetric multi-processor (SMP) nodes 802 are dynamically configured via SMP sockets that use SMP optically-connected switches 804 to dynamically connect SMP optically-connected links 808 A and 808 B connected to each of the SMP nodes 802 to form SMP domains (e.g., Domain A 850A and Domain B 850B) based on best matched expected workloads for coherent traffic for exchanging SMP coherent information. The SMP nodes are dynamically added to one of the SMP domains and/or dynamically removed from one of the SMP domains.

Figure 9:
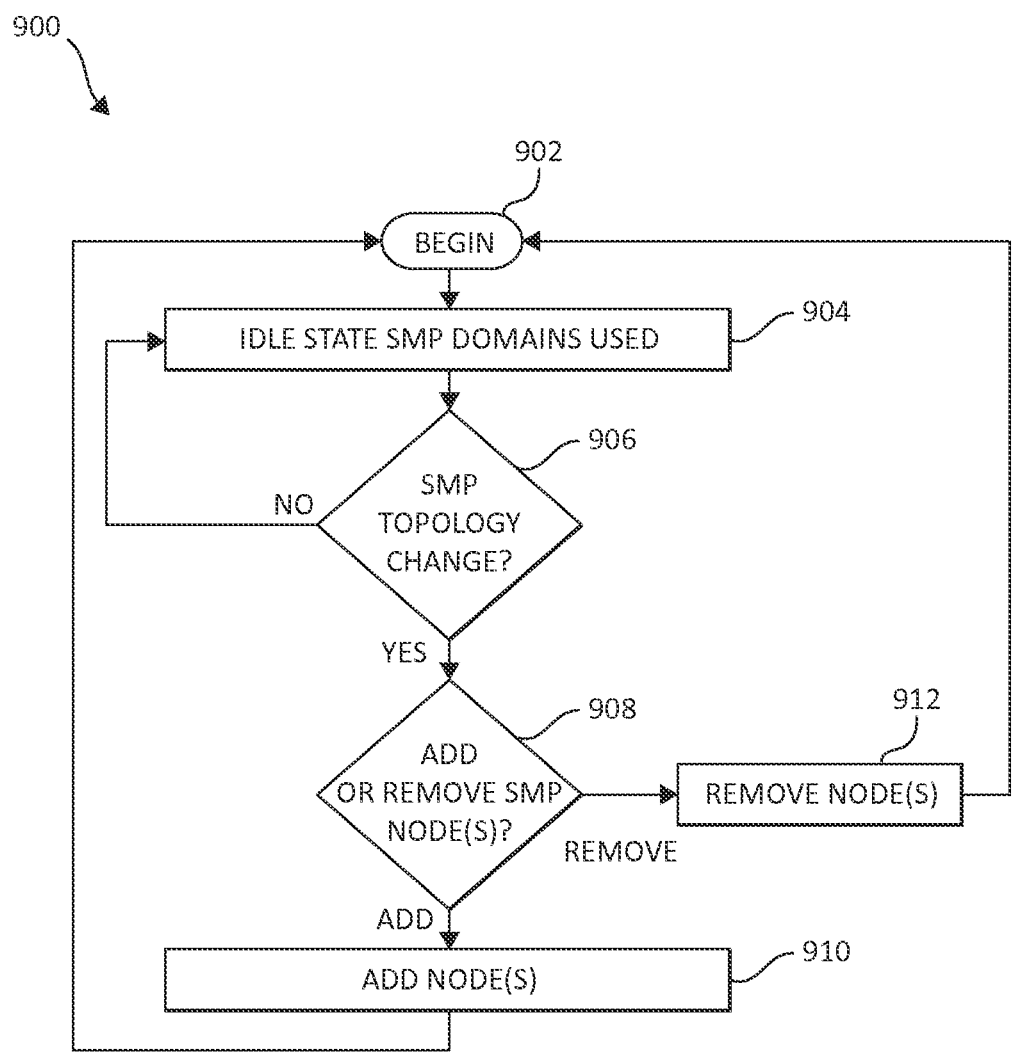
FIG. 9 is a flow chart diagram illustrating an exemplary alternative method for dynamic formation of symmetric multi-processor (SMP) domains in which aspects of the present invention may be realized.

FIG. 9 is a flow chart diagram illustrating an exemplary method 900 for dynamic formation of symmetric multi-processor (SMP) domains in which aspects of the present invention may be realized. The method 900 begins (step 902) in an idle state and one of a variety of symmetric multi-processor (SMP) domains are used (step 904). The method 900 determines if there is a need to change the SMP topology (e.g., change the SMP topology by dynamically configuring together symmetric multi-processor (SMP) nodes via SMP sockets that use SMP optically-connected switches to dynamically connect SMP optically-connected links connected to the SMP nodes to form SMP domains based on best matched expected workloads for coherent traffic for exchanging SMP coherent information (step 906). If no, the method 900 returns to step 904. If yes, the method 900 determines if there is a need to dynamically add at least one SMP node to one of the SMP domains and/or dynamically remove at least one SMP node from one of the SMP domains (step 908). If the method 900 determines at least one SMP needs to be added, the method 900 dynamically adds at least one SMP node to one of the SMP domains (step 910). If the method 900 determines at least one SMP needs to be removed, the method 900 dynamically removes at least one SMP node from one of the SMP domains (step 912).

Figure 10:
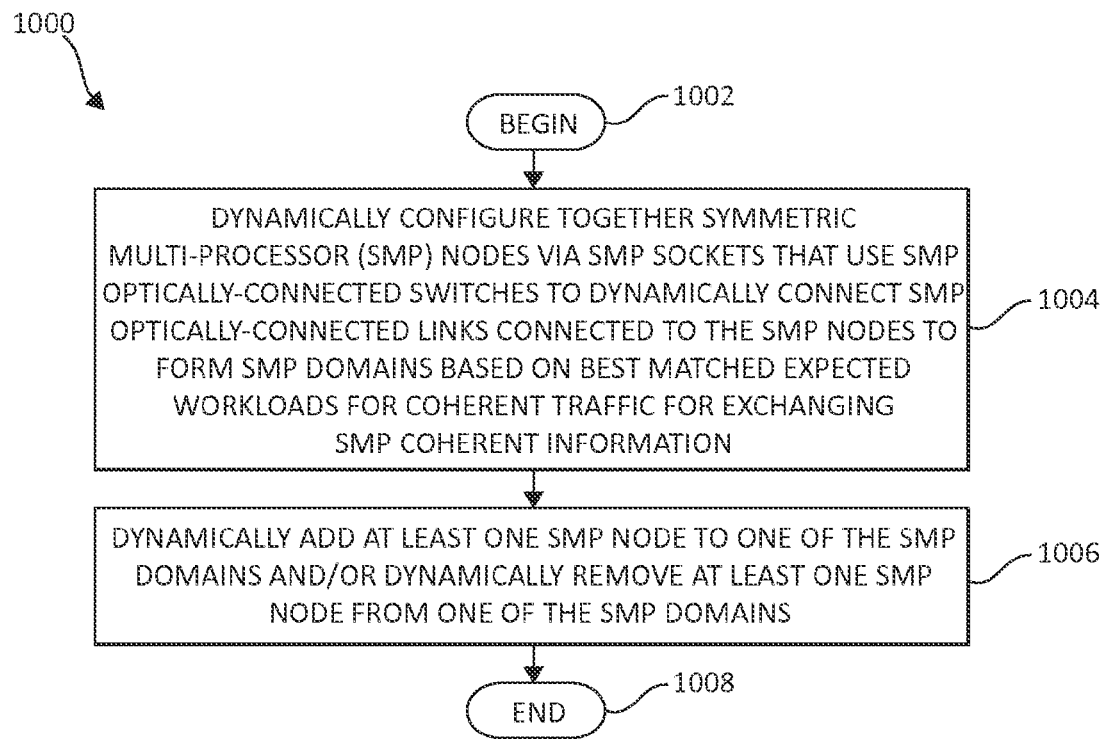
FIG. 10 is a flow chart diagram illustrating an exemplary alternative method for dynamic formation of symmetric multi-processor (SMP) domains in which aspects of the present invention may be realized.

FIG. 10 is a flow chart diagram illustrating an exemplary method 1000 for dynamic formation of symmetric multiprocessor (SMP) domains in an optically-connected system in which aspects of the present invention may be realized. The method 1000 begins (step 1002) dynamically configuring together symmetric multi-processor (SMP) nodes via SMP sockets that use SMP optically-connected switches to dynamically connect SMP optically-connected links connected to the SMP nodes to form SMP domains based on best matched expected workloads for coherent traffic for exchanging SMP coherent information (step 1004). The method 1000 dynamically adds at least one SMP node to one of the SMP domains and/or dynamically remove sat least one SMP node from one of the SMP domains (step 1006). The method 1000 ends (step 1008).

In one embodiment, the present invention provides a solution for dynamic formation of symmetric multi-processor (SMP) domains using at least one processor device in a computing environment. In one embodiment, by way of example only, SMP nodes are dynamically configured via SMP sockets that use SMP optically-connected switches to dynamically connect SMP optically-connected links connected to the SMP nodes to form SMP domains based on best matched expected workloads for coherent traffic for exchanging SMP coherent information. The SMP nodes are dynamically added to one of the SMP domains and/or dynamically removed from one of the SMP domains.

In one embodiment, best matched expected workloads for coherent traffic SMP domains are formed as one of the multiplicity of SMP domains for increasing the efficiency of exchanging the SMP coherent information. In one embodiment, at least one of the SMP nodes are split into SMP domains.

In one embodiment, the present invention provides for sharing memory between each of the SMP nodes in one of the SMP domains, accessing components in each of the SMP nodes in one of the SMP domains, accepting coherent traffic transactions in each of the SMP nodes in one the SMP domains, marking the address spaces associated with accessing shared coherent memory of each of the p SMP nodes in one the SMP domains, and/or accepting local cache copies for accessing the shared coherent memory of each of the SMP nodes in one of the SMP domains.

In one embodiment, the present invention provides for associating similar address spaces associated with accessing shared coherent memory in at least one of the SMP domains, and/or using the similar address spaces associated with accessing the shared coherent memory in at least one of the SMP domains while switching one of the SMP sockets to an alternative one of the SMP domains.

In one embodiment, the present invention provides for invalidating all cache related to shared coherent memory for the one of the multiplicity of nodes in at least one of the multiplicity of SMP domains when removing the one of the multiplicity of nodes.

In one embodiment, the optically-connected system may be an optically-connected circuit network system and/or an electrical circuit system, and the SMP optically-connected links includes at least an optical switching fabric communicatively coupled between each one of the multiplicity of SMP nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for dynamic formation of symmetric multi-processor (SMP) domains in an optically-connected system having an optical switch in a computing environment, comprising:
   dynamically configuring together a plurality of SMP nodes via a plurality of SMP sockets that use the optical switch to dynamically connect a plurality of SMP optically-connected links connected to the plurality of SMP nodes to form a plurality of SMP domains based on best matched expected workloads for coherent traffic for exchanging SMP coherent information, wherein the plurality of SMP domains each have at least two of the SMP optically-connected links connected through the optical switch, and the at least two SMP optically-connected links for each SMP domain are split to be separate from the at least two SMP optically-connected links of others of the plurality of SMP domains, such that each SMP domain has its own coherent traffic and such that a workload of each of the SMP domains is isolated from workloads of other SMP domains of the plurality of SMP domains; and
   performing one of:
      dynamically adding one of the plurality of SMP nodes to the one of the plurality of SMP domains, and
      dynamically removing the one of the plurality of SMP nodes from the one of the plurality of SMP domains.

2. The method of claim 1, further including forming best matched expected workloads for coherent traffic of the plurality of SMP domains for increasing the efficiency of exchanging the SMP coherent information.

3. The method of claim 1, further including performing one of:
   sharing memory between each of the plurality of SMP nodes in at least one of the plurality of SMP domains,
   accessing at least one of a plurality of components in each of the plurality of SMP nodes in the at least one of a plurality of SMP domains,
   accepting coherent traffic transactions in each of the plurality of SMP nodes in the at least one of the plurality of SMP domains,
   marking the address spaces associated with accessing shared coherent memory of each of the plurality of SMP nodes in the at least one of the plurality of SMP domains, and
   accepting local cache copies for accessing the shared coherent memory of each of the plurality of SMP nodes in the at least one of the plurality of SMP domains.

4. The method of claim 1, further including performing one of:
   associating similar address spaces associated with accessing shared coherent memory in at least one of the plurality of SMP domains, and
   using the similar address spaces associated with accessing the shared coherent memory in the at least one of the plurality of SMP domains while switching one of the plurality of SMP sockets to an alternative one of the plurality of SMP domains.

5. The method of claim 1, further including invalidating all cache related to shared coherent memory for the one of the plurality of nodes in at least one of the plurality of SMP domains when removing the one of the plurality of nodes.

6. The method of claim 1, wherein the optically-connected system is one of an optically-connected circuit network system and an electrical circuit system, and the plurality of SMP optically-connected links includes at least an optical switching fabric communicatively coupled between each one of the plurality of SMP nodes.

7. An optically-connected system for dynamic formation of symmetric multi-processor (SMP) domains in a computing environment, comprising:
   the optically-connected system;
   at least one memory in the optically-connected system;
   a plurality of SMP nodes connected to the at least one memory, in the optically-connected system, wherein the at least one memory includes a cache;
   an optical switch in the optically-connected system;
   a plurality of SMP optically-connected links connected to the plurality of SMP nodes, wherein the plurality of SMP optically-connected links includes at least an optical switching fabric communicatively coupled between each one of the plurality of SMP nodes;
   a plurality of SMP sockets associated with the plurality of nodes; and at least one processor device operable in the optically-connected system, wherein the at least one processor device:

dynamically configures together the plurality of SMP nodes via the plurality of SMP sockets that use the optical switch to dynamically connect the plurality of SMP optically-connected links connected to the plurality of SMP nodes to form a plurality of SMP domains based on best matched expected workloads for coherent traffic for exchanging SMP coherent information, wherein the plurality of SMP domains each have at least two of the SMP optically-connected links connected through the optical switch, and the at least two SMP optically-connected links for each SMP domain are split to be separate from the at least two SMP optically-connected links of others of the plurality of SMP domains, such that each SMP domain has its own coherent traffic and such that a workload of each of the SMP domains is isolated from workloads of other SMP domains of the plurality of SMP domains, and performs one of:
dynamically adding one of the plurality of SMP nodes to the one of the plurality of SMP domains, and
dynamically removing the one of the plurality of SMP nodes from the one of the plurality of SMP domains.

8. The optically-connected system of claim 7, wherein the at least one processor device forms best matched expected workloads for coherent traffic of the plurality of SMP domains for increasing the efficiency of exchanging the SMP coherent information.

9. The optically-connected system of claim 7, wherein the at least one processor device performs one of:
sharing the at least one memory between each of the plurality of SMP nodes is at least one of the plurality of SMP domains,
accessing at least one of a plurality of components in each of the plurality of SMP nodes in the at least one of the plurality of SMP domains,
accepting coherent traffic transactions in each of the plurality of SMP nodes in the at least one of the plurality of SMP domains,
marking the address spaces associated with accessing shared coherent memory of each of the plurality of SMP nodes in the at least one of the plurality of SMP domains, and
accepting local cache copies for accessing the shared coherent memory of each of the plurality of SMP nodes in the at least one of the plurality of SMP domains.

10. The optically-connected system of claim 7, wherein the at least one processor device performs one of:
associating similar address spaces associated with accessing shared coherent memory in at least one of the plurality of SMP domains, and
using the similar address spaces associated with accessing the shared coherent memory in the at least one of the plurality of SMP domains while switching one of the plurality of SMP sockets to an alternative one of the plurality of SMP domains.

11. The optically-connected system of claim 7, wherein the at least one processor device invalidates the cache related to shared coherent memory for the one of the plurality of nodes in at least one of the plurality of SMP domains when removing the one of the plurality of nodes.

12. The optically-connected system of claim 7, wherein the optically-connected system is one of an optically-connected circuit network system and an electrical circuit system.

13. In an optically-connected system for dynamic formation of symmetric multi-processor (SMP) domains in a computing environment using a processor device, a computer program product comprising a non-transitory computer-readable storage medium having computer-readable program code portions stored therein, the computer-readable program code portions comprising:

a first executable portion that dynamically configures together a plurality of SMP nodes via a plurality of SMP sockets that use an optical switch to dynamically connect a plurality of SMP optically-connected links connected to the plurality of SMP nodes to form a plurality of SMP domains based on best matched expected workloads for coherent traffic for exchanging SMP coherent information, wherein the plurality of SMP domains each have at least two of the SMP optically-connected links connected through the optical switch, and the at least two SMP optically-connected links for each SMP domain are split to be separate from the at least two SMP optically-connected links of others of the plurality of SMP domains, such that each SMP domain has its own coherent traffic and such that a workload of each of the SMP domains is isolated from workloads of other SMP domains of the plurality of SMP domains; and a second executable portion that performs one of:
dynamically adding one of the plurality of SMP nodes to the one of the plurality of SMP domains, and
dynamically removing the one of the plurality of SMP nodes from the one of the plurality of SMP domains.

14. The computer program product of claim 13, further including a third executable portion that forms best matched expected workloads for coherent traffic SMP domains as one of the plurality of SMP domains for increasing the efficiency of exchanging the SMP coherent information.

15. The computer program product of claim 13, further including a third executable portion that performs one of:
sharing memory between each of the plurality of SMP nodes in at least one of the plurality of SMP domains,
accessing at least one of a plurality of components in each of the plurality of SMP nodes in the at least one of the plurality of SMP domains,
accepting coherent traffic transactions in each of the plurality of SMP nodes in the at least one of the plurality of SMP domains,
marking the address spaces associated with accessing shared coherent memory of each of the plurality of SMP nodes in the at least one of the plurality of SMP domains, and
accepting local cache copies for accessing the shared coherent memory of each of the plurality of SMP nodes in the at least one of the plurality of SMP domains.

16. The computer program product of claim 13, further including a third executable portion that performs one of:
associating similar address spaces associated with accessing shared coherent memory in at least one of the plurality of SMP domains,
using the similar address spaces associated with accessing the shared coherent memory in at least one of the plurality of SMP domains while switching one of the plurality of SMP sockets to an alternative one of the plurality of SMP domains, and invalidates the cache related to shared coherent memory for the one of the plurality of nodes in at least one of the plurality of SMP domains when removing the one of the plurality of nodes.

17. The computer program product of claim 13, wherein the optically-connected system is one of an optically-connected circuit network system and an electrical circuit system, and the plurality of SMP optically-connected links includes at least an optical switching fabric communicatively coupled between each one of the plurality of SMP nodes.

* * * * *